Figure 1:
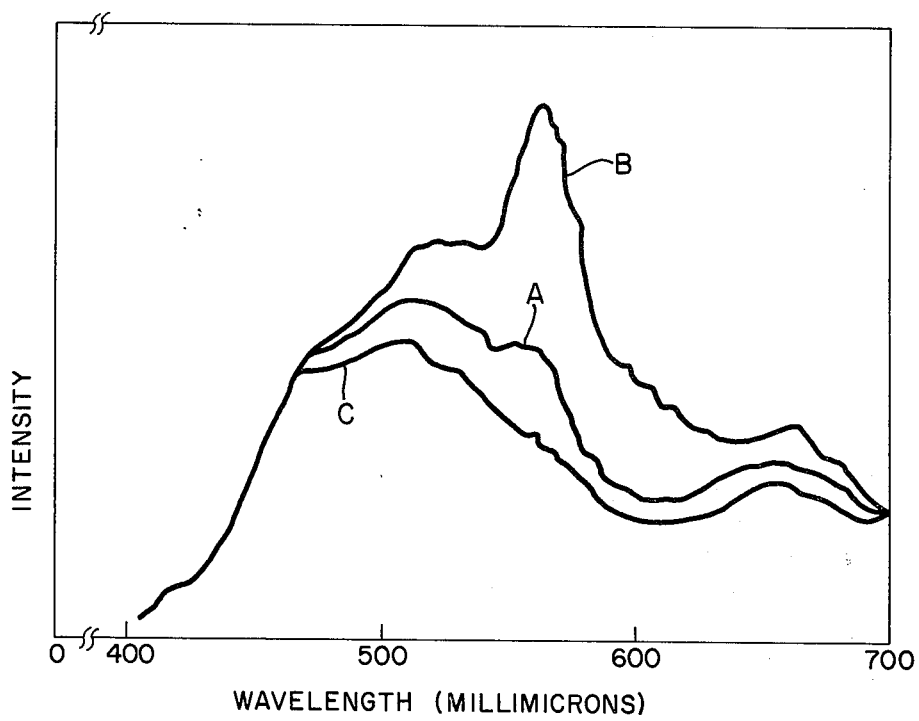

United States Patent
Hirschfeld

[11] 3,899,297
[45] Aug. 12, 1975

[54] BIOLOGICAL STAINING TECHNIQUE AND MIXTURE THEREOF

[75] Inventor: Tomas Hirschfeld, Framingham, Mass.

[73] Assignee: Block Engineering, Inc., Cambridge, Mass.

[22] Filed: Dec. 19, 1973

[21] Appl. No.: 426,088

[52] U.S. Cl............... 23/230 B; 8/1 W; 8/3; 8/25; 23/230 M; 195/103.5 R; 252/301.2 R; 252/408; 424/3
[51] Int. Cl.² .............. G01N 21/20; G01N 33/16; C09B 69/00
[58] Field of Search ......... 23/230 B, 230 M; 8/1 W, 8/3, 25; 252/301.2 R, 408; 195/103.5 R; 424/3

[56] References Cited
UNITED STATES PATENTS

| | | | |
|---|---|---|---|
| 2,302,645 | 11/1942 | Switzer | 8/1 W |
| 3,678,151 | 7/1972 | Horonick | 252/408 |
| 3,817,706 | 6/1974 | Smith | 23/230 B |

OTHER PUBLICATIONS
D. J. Goldstein, Nature, 191, 407–408, (July 22, 1961).
Chemical Abstracts, 67:79850s, (1967).
Chemical Abstracts, 69:82045e, (1968).
Chemical Abstracts, 73:52946q, (1970).

*Primary Examiner*—Morris C. Wolk
*Assistant Examiner*—Sidney Marantz
*Attorney, Agent, or Firm*—Schiller & Pandiscio

[57] ABSTRACT

A technique for distinguishing between closely related biological compounds by staining one of the compounds with a mixture of dyes, at least two of which bind to a first one of the compounds with a first difference in binding energies. The dyed compound is spectrally excited, and the intensities of a selected pair of widely separated spectral peaks are measured and ratioed. For that mixture of dyes and the selected pair of peaks, the ratio is characteristic of the first compound and can be used to distinguish that first compound from other closely related compounds by comparison of the measured ratio with standard values attained by dyeing known samples of the various closely related compounds with the same combination of dyes and measuring the intensities at the same selected pair of peaks.

13 Claims, 2 Drawing Figures

BIOLOGICAL STAINING TECHNIQUE AND MIXTURE THEREOF

The present invention relates to the classification of microparticulate chemical species, and particularly to a novel classification method using biological staining techniques.

It is known that if two complex organic compounds, closely related to one another (such as the nucleic acids DNA and RNA) are treated with a stain or dye having different binding behavior for each of those compounds, the spectral emission and/or absorption characteristics of the dyed species will differ by a measurable spectral energy shift. By this technique, known as metachromasia, observation of the shift may permit one then to differentiate between the several dyed compounds. The emission or absorption is usually broad band and the differences in binding energies for the two substrate materials appears as shifts in some of the peaks of the spectral response. This spectral shift however is usually very small and is detectable with difficulty, if at all.

The principal object of the present invention is to provide a technique for staining a chemical compound so that it can provide a characteristic spectral response readily distinguishable from the spectral response of a closely related compound stained with the same technique. Other objects of the present invention are to provide a simple staining technique which will provide an improvement in selectivity over conventional metachromasia; to provide such a technique which can permit one to readily distinguish between genetic protein materials such as RNA and DNA; and to provide such method or technique which permits one to distinguish single stranded and double stranded nucleic acids from one another.

In accordance with the present invention the foregoing objects are achieved by the simultaneous application of a mixture of at least two different stains which bind to the same first chemical species with binding energies which have a first difference $\Delta E_1$. The same stains when applied from the same mixture to a second chemical species very closely related to the first species, will bind with binding energies having a second difference $\Delta E_2$, thereby to provide dyed species which are spectrally differentiated with respect to one another. Further conditions are that $\Delta E_1 \neq \Delta E_2$, and either $\Delta E_1$ or $\Delta E_2$ can be zero.

Conventional staining and radiant energy excitation and detection methods are applied in accordance with the details provided hereinafter. Measurements over one or more band of wavelengths at characteristic wavelengths of each dye, are made of the intensities of radiation emitted and/or absorbed by the dyed species in response to self-excitation or externally applied excitation.

Other objects of the present invention will in part appear hereinafter and will in part appear obvious. The invention accordingly comprises the process including the several steps and the relation of one or more of such steps with respect to each of the others, all of which are exemplified in the following detailed disclosure and the scope of the application of which will be indicated in the claims.

Figure 2:
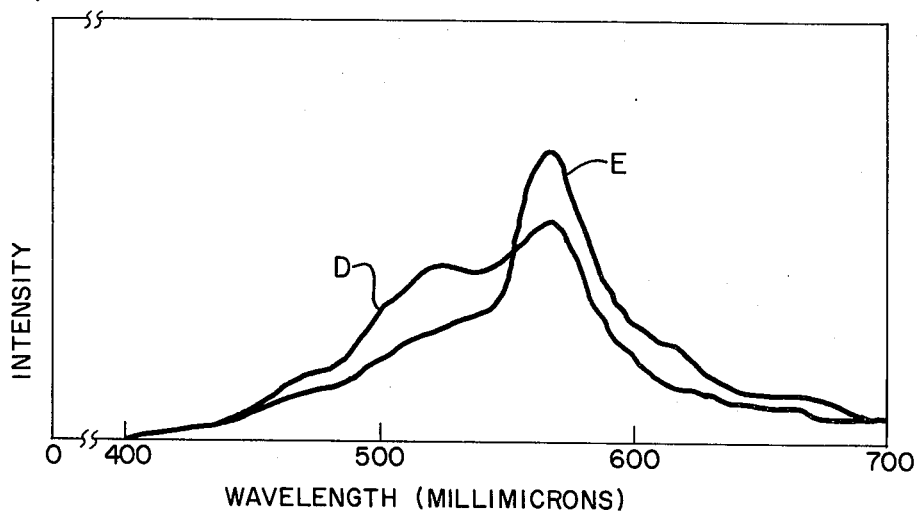

For a fuller understanding of the nature and objects of the present invention, reference should be had to the following detailed description taken in connection with the accompanying drawings wherein FIG. 1 is a plot of measured fluorescent intensity versus wavelength for chemical species in a fluid in accordance with Example I;

FIG. 2 is a plot of measured fluorescent intensity versus wavelength for other chemical species in a fluid in accordance with Example II.

Generally, in carrying out the invention, a sample containing a chemical compound to be identified from a set of compounds, typically a biological sample such as DNA and RNA or the like, suspended in a fluid, is simultaneously charged with at least two spectrally well differentiated different stains or dyes, each of which binds to that set of chemical compounds with a different difference of binding energies. The dyes selected should be chemically compatible with one another, i.e., they should not react with one another to precipitate or otherwise interfere with the spectral characteristics of the other.

Observation of the dyed compound may be of the intensity of absorption by that dyed compound with respect to exciting radiation, or the emission intensity characteristics of the dyed compound under externally applied radiant stimulation, or the emission intensity characteristics of the dyed compound resulting from stimulated emission by energy transfer from adjacent molecules.

Typically in metachromasia, observation is made of the radiant intensity in two or more close bands at the maximum slope locations in the spectral responses, or by wide band measurements covering spectrally each half of the entire original band. The relative intensities measured then provide a value which is compared with like relative values of intensities in the same bands established for known compounds dyed with the same dye. The technique however is too insensitive to permit one to distinguish between two very closely related compounds.

In the present invention observation is made at two widely separated spectral peaks, i.e., having a separation large compared to the wave band of the peaks. The ratio, or some other comparative function, of the intensities of the peaks then characterizes the compound vis-a-vis another closely related compound to which the dyes in the mixture will bind with different binding energies and therefore provide a different intensity ratio of the same peaks. The technique of the present invention thus permits one to distinguish between such closely related compounds as isomers, complex polymers such as RNA or DNA, various types of a polymer (such as DNA) which differ for example only in the location of a number of different amino acids, and even between twinned and untwinned molecules such as single stranded and double stranded DNA.

The principal advantage of the present invention can be clearly seen upon consideration of the following:

If one simultaneously stains a chemical compound A with two appropriate dyes or stains 1 and 2 in an equilibrium process, one can assert that $$\Delta E_A = E_{A1} - E_{A2}$$

(1)

where $E_{A1}$ is the binding energy of stain 1 to compound A, $E_{A2}$ is the binding energy of stain 2 to compound A, and $\Delta E_A$ is the difference between the binding energies.

At equilibrium, the stains will be bound on the substrate in proportions dependent, inter alia, upon their binding energies. Upon excitation, the relative intensities, $I_{11}$ and $I_{12}$ of emission (or absorption) due to each of the stained compounds $A1$ and $A2$, can be given by the ratio of their Boltzman equilibrium distributions as:

$$\frac{I_{11}}{I_{12}} = \frac{1 - e^{\Delta E_A/kT}}{1 + e^{\Delta E_A/kT}} \quad (2)$$

Expanding the exponential by the polynomial series ($e^x = 1 + X \ldots$) and neglecting all but the first term of the expansion, equation (2) becomes $$\frac{I_{11}}{I_{12}} = \frac{\Delta E_A/kt}{2 - \Delta E_A/kt} \quad (3)$$

Assuming that $EA$ is very small (the only case of interest here) equation (3) simplifies to $$\frac{I_{11}}{I_{12}} = \frac{\Delta E_A/kt}{2} \quad (4)$$

Similarly, for another chemical compound B which may be very closely related chemically or physically to compound A but binds dyes 1 and 2 somewhat differently, one can derive another ratio $$\frac{I_{B1}}{I_{B2}} = \frac{\Delta E_B/kt}{2} \quad (5)$$

The measured difference between the two compounds dyed with the two dyes is the algebraic difference of the two ratios and appears as the value $V$ $$V = \frac{\Delta E_B - \Delta E_A}{2kt} \quad (6)$$

Defining the difference $\Delta E$ as the difference $\Delta E_B - \Delta E_A$ we can write, $$V = \frac{\Delta E}{2kt} \quad (7)$$

It can be shown that the signal obtained in metachromasia is a second order signal induced by spectral shifts. Regardless of whether or not the band under consideration has a Gaussian or Lorentzian shape, comparison of the value of the difference signal $V$ obtained in the present invention to the metachromasia signal, indicates that the signal $V$ ranges from about 3.4 to about 34 times larger than the optimum signal obtained for Gaussian peaks and ranges from about 4.6 to about 25 times larger than the optimum signal obtained for Lorentzian peaks by metachromasia, as formerly practised.

It should be noted that the dyes employed in the present invention should be applied simultaneously and must be chemically compatible with one another, but need not be otherwise similar. Indeed, it is preferred that the two dyes have substantially different spectral characteristics and it is necessary that each of them bind to the compound under examination not compensatorily, i.e., the dyes in a given mixture should not bind to compound A in exactly the ratio at which they will bind to compound B from the same mixture, compound B being for example, closely related to compound A. Of course, fluorochrome dyes are preferred, particularly when dealing with samples in fluid wherein the unbound dyes cannot be washed out.

A tremendous variety of dyes can be employed, provided that the multiple combination of dyes meets the criteria above set forth. For example, when dealing with chemical species containing nucleic acids, one can employ acridine orange, yellow GR, quinacrine mustard, ethydium bromide, pyronine B, aurophosphine, euchrysine, 2GNX and 3R, vesuvin, rhodamine, S, B and 6G, coriphosphine O, civanol, acriflavine, atabrine, phosphine, benzoflavine, rheonine A, thioflavine T, berberine and the like.

Particularly desirable dye combinations are respectively a mixture of berberine sulfate and acronol phloxine mixed in substantially equal weight amounts in a solvent such as water, or a similar mixture of astrazone orange and acronol phloxine. The particular proportions of the two dyes is not critical provided however that sufficient amounts of both dyes will bind to the chemical species under examination so as to provide spectral characteristics due to each of the dyes, at an intensity sufficient to permit it to be detected despite simultaneous characteristic emission due to the other dye bound to the species under test. In other words, the emission from one dye should not swamp the signals from the other. This can be done by adjusting concentration ratios in the solution to balance the dye ratio in both compounds symmetrically around the equal binding point for maximum sensitivity. Nor is the present invention to be considered limited to a two-dye system, for it should be apparent to those skilled in the art that combinations or more than two dyes can also be used so that the intensity of peaks due to the several dyes can be compared to one another to obtain a relationship which is unique with respect to the particular chemical species involved.

In carrying out the process of the present invention, a number of materials were dyed by a mixture of berberine sulfate and acronol phloxine as above described. The structure of these two dyes is believed to be respectively as follows.

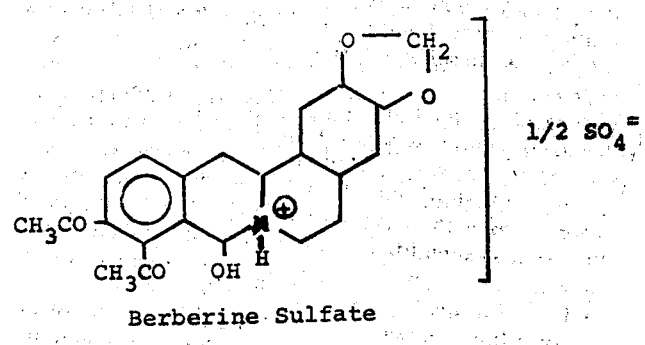

Berberine Sulfate

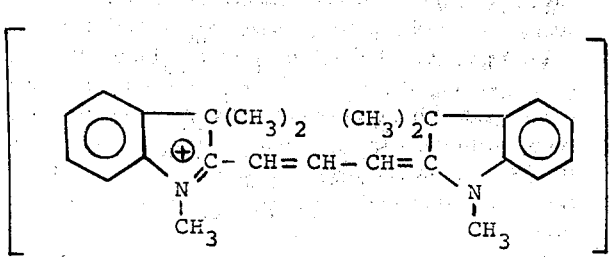

Acronol phloxine

Dyeing was achieved in all the following examples by standard techniques at room temperature using a mixture of the dyes in a concentration of 25 ppm of each in $H_2O$ driven to pH 7.2 with a phosphate buffer.

EXAMPLE I

In this example, a sample containing single stranded RNA was dyed as described and stimulated into fluorescence by input radiation substantially at 365 m$\mu$ provided by a suitable ultraviolet source. The resulting spectrum emitted between about 400 to 700 m$\mu$ is shown as curve A in FIG. 1. It should be observed that the curve exhibits two characteristic peaks respectively at about 515 and 565 m$\mu$. The ratio of the intensities of these respective peaks is about 1.1.

EXAMPLE II

A sample containing single stranded DNA was dyed in accordance with Example I, stimulated into emission as in Example I and the resulting spectrum is shown in FIG. 1 as curve B. It should be noted in curve B that peaks occur at substantially 515 and 565 m$\mu$, but here the ratio of intensities of the former to the latter is about 0.7, very distinctly different than the ratio provided for curve A.

EXAMPLE III

A sample containing double-stranded DNA was dyed and irradiated in accordance with Exampale I and the resulting spectrum is displayed as curve C in FIG. 1. As in the previous two examples a peak appears at about 515 and 565 m$\mu$, but here the ratio of intensities of the former to the latter is about 1.4.

EXAMPLE IV

A sample containing a T2 phage was dyed and irradiated in accordance with Example I, and the spectrum observed is shown as curve D in FIG. 2. For this species, it should be noted that there are two characteristic peaks, respectively at about 520 and 570 m$\mu$. The ratio of intensities of the former to the latter is about 0.8.

EXAMPLE V

A sample containing F2 phage was dyed and irradiated in accordance with Example I and the resulting spectrum is shown as curve E in FIG. 2. It will be seen that the ratio of the intensities at about 520 m$\mu$ to the intensity in the 570 m$\mu$ peak is somewhat less than 0.4.

Characteristic peaks of the foregoing five examples have been selected and compared to one another by ratioing in order to normalize the data, and it will be understood that other normalization techniques can be employed. Similarly, other wavelength bands or peaks may be used as the basis of comparison. It will be seen from the curves of FIG. 1 that the three closely related biological compounds used in Examples I through III nevertheless give substantially spectrally shifted results when dyed with the multiple dye mixture of the invention, sufficient to permit one skilled in the art to readily identify each of the materials from a set of standard normalized comparisons of several intensity peaks for each of the materials. A similar conclusion can be drawn from the curves of FIG. 2 indicating that two closely related viral materials, T2 and F2 phages, can be distinguished from one another, or identified by comparison with standards, all in accordance with the techniques of the present invention.

Since certain changes may be made in the above process without departing from the scope of the invention herein involved, it is intended that all matter contained in the above description or shown in the accompanying drawings shall be interpreted in an illustrative and not in a limiting sense.

What is claimed is:

1. Method of characterising an unknown organic chemical compound, said method comprising, staining said compound simultaneously in an equilibrium process with a mixture of at least two chemically compatible dyes each of which binds to said compound with a different binding energy said dyes being selected and in sufficient amount in said mixture so that when bound to said compound each dye provides spectral characteristics to the dyed compound sufficient to permit detection of the spectral characteristics of said dyed compound due to the other of said dyes;

exciting a spectral response in the dyed compound;

observing said spectral response at least at two different wavelength bands in the spectrum of said response, and comparing the intensities observed at said bands to obtain a value characteristic of the difference in the binding energies of said dyes to said compound.

2. Method as defined in claim 1 wherein said dyes are fluorescent dyes.

3. Method as defined in claim 2 wherein when bound to said compound, said dyes are excited by irradiation with ultraviolet light.

4. Method as defined in claim 1 wherein one of said dyes is acronol phloxine.

5. Method as defined in claim 4 wherein the other of said dyes is berberine sulfate.

6. Method as defined in claim 4 wherein the other of said dyes is astrazone orange.

7. Method as defined in claim 1 wherein said response is spectral emission excited by external irradiation of said dyes compound.

8. Method as defined in claim 1 wherein said response is spectral absorption by said dyes compound, of external irradiation.

9. Method as defined in claim 1 wherein said response is spectral emission stimulated by energy transfer from molecules adjacent to dye molecules bound to said compound.

10. Method as defined in claim 1 wherein each of said wavelength bands is characteristic of a peak spectral response of a corresponding one of said dyes.

11. Method as defined in claim 1 including the step of comparing the value obtained for said unknown compound with values obtained by dyeing known compound with the same combination of dyes, exciting the thus dyed known compound and comparing the intensities observed at said bands for such dyed known compound.

12. A dye mixture comprising berberine sulfate and acronol phloxine.

13. A dye mixture comprising astrazone orange and acronol phloxine.

* * * * *